Jan. 1, 1957 C. M. PERKINS 2,775,901
SHIFT ACTUATED CONTROL DEVICE
Filed Jan. 31, 1955
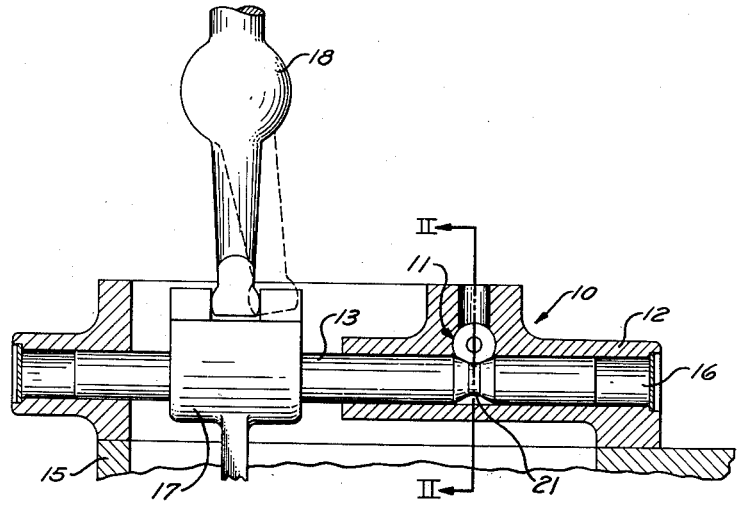
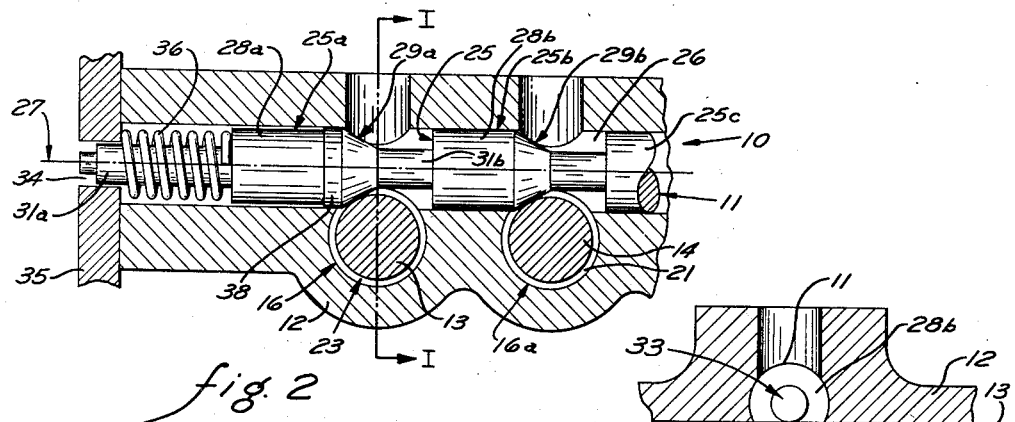
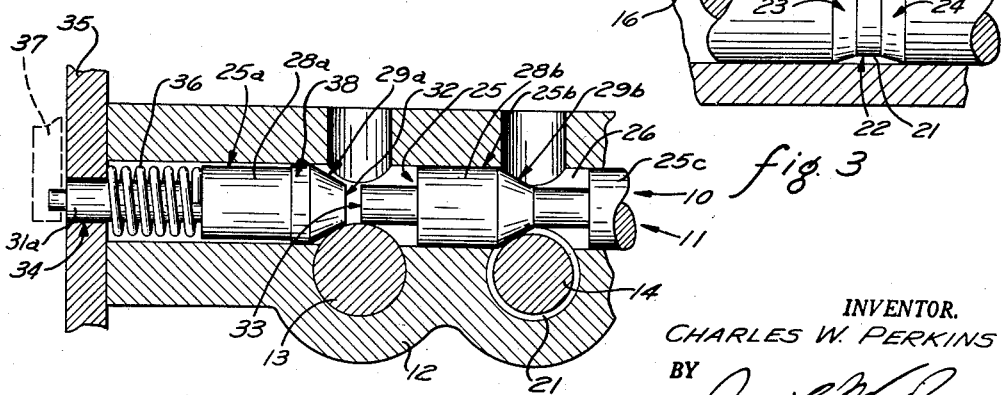
INVENTOR.
CHARLES W. PERKINS
BY
ATTORNEY

United States Patent Office 2,775,901
Patented Jan. 1, 1957

2,775,901

SHIFT ACTUATED CONTROL DEVICE

Charles M. Perkins, Kalamazoo, Mich., assignor to Fuller Manufacturing Company, a corporation of Delaware Application January 31, 1955, Serial No. 484,892

10 Claims. (Cl. 74—110)

This invention relates in general to a control device having means actuated into, and held in, a selected position by the shifting of transmission shift rods from the neutral position to a shifted position, and more particularly to a device capable of operation with a minimum of frictional resistance.

It is frequently desired to regulate certain operations in an automotive vehicle in accurate response to the shifting of the main transmission therein. Use of the conventional interlock mechanism, to actuate a valve or a switch, as shown by my Patent No. 2,654,268, has been attempted for this purpose in the past, and has in some cases been satisfactory. However, in other cases this use of the interlock mechanism has placed an excessive frictional load onto the shift lever and, even where the frictional load can be tolerated, the use of the interlock mechanism often has not provided a movement of sufficient magnitude to actuate the desired type of control devices.

Accordingly, a primary object of this invention has been the provision of an independent, shift actuated, control device for effecting or blocking the operation of a valve or switch and operable with, and actuable by, one or more shift rods of a conventional transmission whereby movement of any one of said shift rods into a shifted position will effect a strong, positive movement of said control device.

A further object of this invention is the provision of a shift actuated control device, as aforesaid, which is entirely separate from the interlock mechanism of the transmission and is expressly designed to provide an efficient control means for the purposes above indicated, operable without materially increasing the frictional load upon the shift lever and without requiring any alteration of, or interference with, the effectiveness of the regular interlock mechanism of the transmission.

A further object of this invention is the provision of a shift actuated control device, as aforesaid, which is simple in operation and manufacture, which can be easily adapted to use with transmissions of a type presently in use, whose parts are characterized by a structure which insures a long operating life and a minimum of maintenance, and which can produce a stronger and longer control motion than possible with existing devices for the same purpose.

Other objects of this invention will become apparent to persons familiar with this type of equipment upon reading the following specification and examining the accompanying drawings in which:

Figure 1 is a vertical, cross-sectional view of that portion of a transmission containing the shift rods or yoke bars and taken along a plane as indicated by the cutting line I—I in Figure 2.

Figure 2 is a sectional view taken along the line II—II of Figure 1.

Figure 3 is a fragment of Figure 1 with the visible shift rod thereof shown in a shifted position corresponding to the broken line position of the shift lever in Figure 1.

Figure 4 is a sectional view substantially as taken along the line II—II of Figure 1 with the shift actuated control device in a position corresponding to the position of the shift rod shown in Figure 3.

In meeting the objects and purposes set forth above, as well as others incidental thereto, I have provided a control device 10 (Figures 1 and 2) comprised of a cylindrical actuator unit 11 axially, slidably disposed within the shift rod housing 12 transversely of, and engageable with, at least one shift rod, such as the rod 13. Movement of said shift rod from the neutral to a shifted position effects an axial movement of the actuator unit 11 in a manner and for purposes disclosed hereinafter.

For convenience in description, the terms "upper," "lower," "leftward," "rightward" and derivatives thereof, as used herein, will have reference to the invention as appearing in Figure 2. The terms "frontward" and "rearward" will have reference to the leftward and rightward ends, respectively, of the device as appearing in Figure 1. The terms "inner" and "outer" will have reference to the geometric center of the control device and parts associated therewith.

*Detailed construction*

As shown in Figure 1, the shift rod housing 12 is mounted in a conventional manner upon the upper, forward end of a conventional transmission gear housing 15. One or more horizontally disposed, cylindrical shift rods, or yoke bars, such as the shift rods 13 and 14 (Figure 2), are axially and horizontally slidably disposed within cylindrical openings 16 and 16a in said housing 12. Each of said rods supports a shift yoke 17 engageable by the lower end of a shift lever 18 in a conventional manner. For further details of a typical shift yoke, shift lever and transmission gear housing, which details are not essential to this invention, reference is made to my Patent No. 2,654,268. Each of said shift rods, as for example the shift rod 13 (Figures 1 and 2), is provided with a coaxial, annular groove 21 intermediate its axial ends, said groove having a bottom wall 22 (Figure 3) and a pair of conical end walls 23 and 24. At least one, and preferably both, of said end walls 23 and 24 are sloped radially outwardly away from each other.

The actuator unit 11, which is preferably comprised of a plurality of separable, coaxial bar elements 25, is disposed within a cylindrical bar opening 26 for axial and rotational movement therewithin. The axis of the opening 26 is perpendicularly transverse of the axes of the shift rods 13 and 14. The axis of said bar opening 26, indicated by the centerline 27, is preferably parallel to a plane through the axes of the shift rods 13 and 14. In this embodiment, said centerline 27 is also spaced from the peripheries of said rods 13 and 14.

The bar elements 25 are preferably substantially identical to each other. As indicated by the bar element 25b in Figures 2 and 4, said elements 25 are comprised of a central, cylindrical portion 28b snugly, but rotatably and axially slidably, disposed within the bar opening 26 and having a conical surface 29b at one axial end thereof, which surface is continuously engageable with the periphery of the adjacent shift rod, as shift rod 14. A connector stem 31b of reduced diameter and coaxial with the central portion 28b extends from the other axial end thereof. The axial ends of said bar elements 25 are preferably, but not necessarily, provided with flat surfaces 32 and 33 (Figure 4) perpendicular to the centerline 27 of the actuator unit 11. The length of the connector 31b is preferably sufficient to prevent interference of the central portion 28b of the bar element 25b with the shift rod 13 when the shift rod 14 is in the shifted position. The overall length of the bar element 25b is preferably, substantially equal to the distance between the axes of the shift rods 13 and 14.

The bar element 25a may be varied from the structure of the other bar elements by providing its central portion 28 with a slight reduction in diameter throughout the major portion of its length, thereby providing a relatively small, annular, bearing surface 38 for engagement with the walls of the bar opening. 26. This will permit a certain amount of radial movement by the leftward end of the connector stem 31a of said bar element 25a for the purpose of aligning said connector stem 31a with a connector opening 34 in an end plate 35 on the shift rod housing 12. The connector stem 31a may, as shown in this particular embodiment, be somewhat longer than the corresponding connector stems of the bar elements 25b and 25c for the purpose of extending through said housing end plate 35.

A resilient means, such as the coil spring 36, encircles the connector stem 31a within the bar opening 26 between the housing end plate 35 and the central portion 28a of the bar element 25a. The spring 36 is under continuous compression, thereby continuously urging the conical end surface 29a against the shift rod 13, hence urging the conical end surface 29b against the shift rod 14, and so on for any number of shift rods, when all said rods are in a neutral position.

The slope of the conical end surfaces 29 and the end walls 23 and 24 of the groove 21, which are engageable in various axial positions of the shift rods 13 and 14, may vary depending upon the length of the stroke desired in the axial movement of the actuator unit 11, the diameter of said actuator unit, the diameter of the shift rods, the spacing of the centerline 27 from the axes of the shift rods and the permissible increase in frictional loading on the shift lever 18 and the coefficient of friction between the contacting parts, all in accordance with known engineering practice.

In one satisfactory application of my invention the shift rods had a diameter of ¾ of an inch and the actuator unit 11 had a maximum diameter of ⅝ of an inch. The conical end surface 29 had a slope of 30 degrees to the centerline 27 and the end walls 23 and 24 had a slope of 20 degrees to the axes of their respective shift rods. The centerline 27 of the actuator unit 11 was spaced 3/16 of an inch from the peripheries of the shift rods. This arrangement produced an axial stroke of ⅛ of an inch by the actuator unit 11 with a minimum of friction and obstruction to movement of the shift rods and/or lever.

*Operation*

As shown in Figures 1 and 3, the shift rods 13 and 14 may be, and usually are, movable axially in either direction transverse of the centerline 27. This effects an interengagement of a tapered surface of the shift rod with a tapered surface of an actuator bar element 25 to cause an axial movement of one or more of the said bar elements. If the shift rod 13, for example, is shifted out of neutral position, as shown in Figure 4, the bar element 25a will be moved leftwardly and simultaneously rotated during and by movement of said shift rod 13. During such leftward movement of the bar element 25a, the connector stem 31a of bar element 25a is urged outwardly through the connector opening 34 where it can actuate a valve or a switch or it can block transverse movement of an element 37 adjacent thereto. The bar elements 25b and 25c may remain substantially as they were prior to such shifting of the shift rod 13 as shown in Figures 2 and 4. If the shift rod 14 is the one shifted, then both of the bar elements 25a and 25b will be moved leftwardly and simultaneously rotated. Due to the fact that the bar element 25b is snugly disposed between the adjacent end of the bar element 25a and the periphery of the shift rod 14, when all shift rods leftwardly thereof are in neutral position, the leftward movements of both the bar element 25a and of the bar element 25b will be equal and simultaneous. Thus, regardless of whether the shift rod 13 or the shift rod 14 is moved out of neutral position, the connector stem 31a will be moved out through the connector opening 34 substantially the same distance. The same applies to additional shift rods where used.

Movement of the connector stem 31a into extended position (Figures 3 and 4) is completely effected by relative movement of the conical surface 29 from contact with the bottom wall 22 of the annular groove 21 to contact with the periphery of the shift rod. Thus, as in this particular embodiment, the total, movement of the unit 11 may be effected during the first part of the movement of a shift rod from its neutral position into its fully shifted position and, accordingly, the extending movement of the unit 11 may be completely well in advance of the completion of a shift or a shift rod. This relationship between movement of the unit 11 and movement of the shift rod 13 may be varied within wide limits by appropriately varying the width of the grooves 21 in the shift rods. However, the width of the groove 21 must not exceed those limits which would prevent movement of the conical end surface 29 up onto the periphery of the shift rod during a normal movement of said shift rod by the shift lever 18, as shown in Figure 3.

Where, as is preferred and above disclosed, the actuator unit 11 constitutes a plurality of independent bar elements 25, only those elements to the left of the shift rod being shifted, as appearing in Figure 2, will be disturbed by such shift. Furthermore, only that bar element immediately to the left of the shifted rod will be rotated during the shift movement. These features reduce frictional losses. However, the actuator unit 11 may, alternatively, in some cases be provided in a single piece if preferred but this will prevent the separate movements above indicated of the elements 25 and thus materially increase the frictional resistance of the system.

Although a particular, preferred embodiment of my invention has been disclosed and described in detail hereinabove for illustrative purposes, it will be understood that modifications or variations thereof within the scope of said invention are fully contemplated unless specifically stated to the contrary in the appended claims.

I claim:

1. A shift actuated control device operable by one of a plurality of cylindrical shift rods axially slidable within a housing, the combination comprising: means providing a coaxial, annular groove in each of said rods, said grooves each having a conical end wall diverging away from the center thereof; a cylindrical actuator unit axially slidably disposed in said housing transversely of said rods, the extended axis of said unit being spaced from said rods and said unit having a coaxial, conical surface at its one end engageable with each of said conical end walls, the other end of said unit being extendable from said housing; and resilient means continuously urging said surface against said end walls, axial movement of said rod effecting axial movement of the other end of said unit out of said housing when one of said surfaces is engaging one of said end walls.

2. The structure of claim 1 wherein said unit is rotatably supported within said housing, and the amount of axial movement of said rod is a function of the slope of said respective surfaces and the slope of said corresponding end walls.

3. The device defined in claim 1 wherein said unit comprises a plurality of separate bars each rotatable within said housing independently of the others and each contacting less than all of said shift rods.

4. The device defined in claim 1 wherein said unit comprises a plurality of separate bars each rotatable within said housing independently of the others and each contacting only one of said shift rods.

5. A shift actuated control device operable by one of a plurality of cylindrical shift rods axially slidable within a housing, the combination comprising: means providing a recess in the periphery of each of said rods, said recesses each having a sloping end wall diverging away from the center thereof; an actuator unit axially, slidably disposed in said housing substantially transversely of said rods, the axis of said unit being spaced from the axes of said rods, said unit having sloping surfaces therealong engageable with the sloping end wall of each of said rods, one end of said unit being extendable from said housing; and resilient means continuously urging said surfaces against said end walls, axial movement of one of said rods effecting axial movement of said one end of said unit out of said housing when one of said surfaces is engaging one of said end walls.

6. A shift actuated control device operable by one of a plurality of cylindrical shift rods axially slidable within a housing, the combination comprising: means providing a groove in the periphery of each of said rods, said grooves having sloping end walls diverging away from the center of said grooves; an actuator unit axially, slidably disposed in said housing transversely of said rods, the axis of said unit being spaced from the axes of said rods; said unit including a series of axially aligned, individually movable, bar elements, each of said bar elements having a sloping surface engageable with the sloping end walls on one of said rods, each of said bar elements having a connecting stem, the connecting stem on an end one of said bar elements being extendable from said housing, the connecting stems on the remainder of said bar elements being adapted to contact an adjacent bar element; and resilient means acting on said end bar element continuously urging said surfaces against said end walls, axial movement of one of said rods effecting axial movement of the bar element associated therewith when the surface of the bar element is engaging the end wall on said one rod to extend said connecting stem on said end bar element from said housing.

7. The combination of claim 6 wherein each of said bar elements includes an enlarged, cylindrical portion integral with a connecting stem, each of said enlarged, cylindrical portions including a frusto-conical member at one end thereof, said frusto-conical members defining the sloping surfaces of the bar elements.

8. In a control device for use with a change-speed transmission, the combination comprising: a housing; means in said housing defining a series of parallel, cylindrical openings; means in said housing defining a cylindrical passageway, said cylindrical passageway extending transversely to and intersecting each of said series of cylindrical openings, the axis of said passageway being spaced from the axes of said cylindrical openings; a shift rod mounted for movement in each of said cylindrical openings; means defining a groove in the periphery of each of said rods, said grooves having sloping end walls diverging away from the center thereof; an actuator unit axially, slidably disposed in said cylindrical passageway, said actuator unit including a series of axially aligned, individually movable, bar elements, each of said bar elements having a frusto-conical portion defining a sloping surface engageable with the sloping end wall on one of said rods, and each of said bar elements having a connecting stem, the connecting stem on an end one of said bar elements being extendable from the said housing, the connecting stems on the remainder of said bar elements being adapted to contact an adjacent bar element; and resilient means acting on said end bar element continuously urging said surfaces against said end walls, axial movement of one of said rods effecting axial movement of the bar element associated therewith when the surface of the bar element is engaging the end wall on said rod to extend said connecting stem on said end bar element from said housing.

9. A shift actuated control device operable by a cylindrical shift rod axially slidable within a housing, the combination comprising: means providing a recess in the periphery of said rod, said recess having a sloping end wall diverging away from the center thereof; an actuator unit axially, slidably and rotatably disposed in said housing substantially transversely of said rod, the axis of said unit being spaced from the axis of said rod, said unit having a sloping surface engageable with said sloping end wall; and resilient means urging said surface against said rod, axial movement of said rod effecting axial movement of said unit when said surface is engaging said end wall.

10. The combination of claim 9 wherein said actuator unit includes a frusto-conical portion, said portion defining said sloping surface and wherein said recess is defined by an annular groove having conical end walls diverging away from the center of said groove.

References Cited in the file of this patent

UNITED STATES PATENTS

| | | |
|---|---|---|
| 1,397,926 | Fekete | Nov. 22, 1921 |
| 2,637,221 | Backus | May 5, 1953 |
| 2,694,862 | Wire | Nov. 23, 1954 |